United States Patent [19]

Ahlnas et al.

[11] Patent Number: 5,482,529
[45] Date of Patent: Jan. 9, 1996

[54] FERTILIZING PREPARATION IMPROVING THE EXTRACTION OF PHOSPHORUS FOR PLANTS

[75] Inventors: Thomas Ahlnas, Helsinki; Stephan Vermeulen; Anders Weckman, both of Espoo, all of Finland

[73] Assignee: Kemira OY, Espoo, Finland

[21] Appl. No.: 275,522

[22] Filed: Jul. 15, 1994

[30] Foreign Application Priority Data

Jul. 15, 1993 [FI] Finland ............................. 933215

[51] Int. Cl.⁶ ........................... C05B 7/00; C05B 17/00
[52] U.S. Cl. ................. 71/33; 71/29; 71/63; 71/64.08; 71/64.09; 71/64.11; 71/902; 504/101
[58] Field of Search ................... 71/64.09, 64.11, 71/64.08, 29, 33, 63, 902; 504/101

[56] References Cited

U.S. PATENT DOCUMENTS 3,192,030 6/1965 Mills et al.
4,345,931 8/1982 Meyer ............................. 71/64.09

FOREIGN PATENT DOCUMENTS

| 190819 | 8/1986 | European Pat. Off. |
| 203734 | 12/1986 | European Pat. Off. |
| 89260 | 1/1993 | Finland |
| 1592762 | 1/1971 | Germany |
| 3218028 | 11/1983 | Germany |
| 672486 | 11/1989 | Switzerland |

OTHER PUBLICATIONS

WO 93/01150 published Jan. 21, 1993 (Ahlnas).

*Primary Examiner*—Wayne Langel
*Attorney, Agent, or Firm*—Oblon, Spivak, McClelland, Maier, & Neustadt

[57] ABSTRACT

A controllably active fertilizing preparation in the form of an emulsion-suspension or an emulsion is comprised of:

a) 30–90% by weight of mixtures containing plant nutrients, b) 5–50% by weight of water, c) 2–20% by weight of an oleophilic organic substance, d) 1–25% by weight of a surface-active substance, and e) 0.1–10% by weight of an acid or its mixture, salt or anhydride. The acid component improves the extraction of phosphor.

24 Claims, No Drawings

FERTILIZING PREPARATION IMPROVING THE EXTRACTION OF PHOSPHORUS FOR PLANTS

The invention relates to a controllably active fertilizing preparation which is in the form of an emulsion-suspension or emulsion, comprising:

a) 30–90% by weight of a compound containing plant nutrient, b) 5–50% by weight of water, c) 2–20% by weight of an oleophilic organic substance, and d) 1–25% by weight of a surface active substance.

The invention further relates to the use of such a fertilizer mixture as a fertilizer by adding it to the soil.

It is well-known that plants can only partially utilize the phosphorus given as a fertilizer. The direct admission thereof may only be about 10–30% of the given amount while a part of it is bound to the soil in a form difficult to be assimilated by plants. Therefore, the total concentration of low-soluble phosphorus in cultivated land is high in Finland and many European countries. The binding capability of phosphorus varies depending on the soil type, but especially soils containing iron bind it very effectively.

U.S. defence publication T969 003 discloses an emulsion composition consisting of liquid plant nutrient, organic solvent unmixable with water, and a w/o type surface active substance. The composition contains about 13–26% by weight fertilizer, about 60–81% by weight of water, about 4–13% by weight of oil, and about 0.2–1.4% by weight of w/o type surface active substance (examples 4, 6, and 7). The formulation thus relates to liquid fertilizer compositions in which the plant nutrient is dissolved in a large amount of water. The amount of fertilizer is very large and difficult to handle considering its nutritional value. This emulsion composition does not contain a component activating low-soluble phosphorus compounds.

FI application publication 913 257 discloses a controllably active fertilizing preparation which is in the form of a paste, containing plant nutrient, water, oil, and a surface active substance. It does not activate, per se, low-soluble phosphorus compounds.

JP application publication 4-31382 discloses the use of chelating water soluble carboxylic acids and their salts for activating phosphorus compounds combined with soil. According to the publication, these activating substances can be added to the soil either as they are, or together with compound fertilizers, or adsorbed in a carrier.

The solution according to the JP application has the drawback that the adding of acids or their salts to the soil as aqueous solutions causes them to drain off, whereby a major part of them will be lost. If they are added in a liquid form into solid fertilizer, the fertilizer will be decomposed mechanically.

The above drawbacks are now eliminated by a new fertilizing preparation which is mainly characterized by what is said in the characterizing clause of claim 1. When alternatives were studied for rendering the use of phosphorus more effective in fertilizing preparations and for activating phosphorus bound to the soil, it was found that the adding of organic and/or inorganic acids to the fertilizing preparations improved the phosphorus assimilation of plants. It was thus realized that if the fertilizing preparation is in the form of a paste, suspension-emulsion, or emulsion, containing plant nutrient, water, an oleophilic organic substance, and a surface active substance, an acid or acid-forming substance can be added to it without having the components of the fertilizing preparation decomposed mechanically. The fertilizing preparation retains acid or acid-forming substance and thus prevents them from draining off from the soil.

Another advantage of the invention is that, instead of a highly refined source of phosphorus, a cheaper raw material may be used, for instance, rock phosphate (apatite) which is converted, by the effect of the acid contained in the preparation, into a form more usable by plants.

In addition, the acids may be able to improve the trace element assimilation of plants.

The fertilizing preparation according to the invention is either in the form of an emulsion-suspension or an emulsion. It is preferably in the form of a paste.

The acid concentration of the fertilizing preparation is 0.1–10% by weight, based on the total amount of the fertilizing preparation. The concentration greatly depends on the acid or acid derivative used and is according to one embodiment preferably 2–6% by weight.

According to one embodiment the acid is a $C_1$–$C_{10}$-monocarboxylic acid, hydroxycarboxylic acid, or dicarboxylic acid, or a combination, salt or anhydride thereof. Typical monocarboxylic acids include formic acid, acetic acid, and propionic acid. Typical hydroxycarboxylic acids include citric acid and tartaric acid. Typical dicarboxylic acids include oxalic acid, adipic acid, and maleic acid. According to another embodiment the acid is an organic sulphonic acid such as p-toluenesulphonic acid.

According to a third embodiment the acid is a polybasic carboxylic acid such as a polymeric carboxylic acid. Examples thereof include anionic polyelectrolytes, preferably polyacrylic acid, polymethacrylic acid, and α-hydroxyacrylic acid. Good results have been accomplished with hydrolyzed polyacrylic amide.

According to a fourth embodiment the acid is inorganic and preferably a mineral acid like nitric acid or phosphoric acid.

In addition to the free acid, the advantageously effecting acid can be a dissociable derivative of organic acids such as a salt or an anhydride, or a combination of the above-mentioned acids. Typical useful acid compounds include oxalic acid-citric acid-formic acid, nitric acid-phosphoric acid, and oxalic acid-citric acid-formic acid-oxalic acid.

The plant nutrient used in the invention is preferably fertilizer raw material, which together with the water component of the fertilizing preparation forms a compound which is near the saturation point and preferably above it. In the latter case the aqueous phase of the fertilizing preparation contains a compound containing plant nutrients or a precursor thereof in crystal form. Solid plant nutrient can also be suspended in the oil phase or in the oil/water interface.

An advantage of the fertilizing preparation of the present invention is that its emulsion structure essentially remains, independent on the temperature and even after cooling the mixture.

The plant nutrient used in the fertilizing preparation can be any fertilizer raw material known in the art such as N, K and/or P fertilizers. According to a preferred embodiment, the plant nutrient is based on the cations $NH_4^+$, $K^+$, $Ca^{2+}$, $Mg^{2+}$: the anions $NO_3^-$, $Cl^-$, $SO_4^{2-}$, phosphates, polyphosphates; and/or urea and/or trace element nutrients. In addition to urea, concrete compounds include ammonium nitrate, ammonium phosphates such as diammonium phosphate, potassium chloride, superphosphates, and alkaline earth oxides. Because the fertilizing preparation of the invention contains phosphorus-activating acid or acid derivative, the preparation can contain a more low-soluble phosphorus compound than usually. Therefore, it is advantageous if the preparation contains a low-soluble phosphor compound, preferably apatite.

The fertilizing preparation improving the assimilation of phosphorus contains about 30–90% by weight, preferably about 60–80% by weight percent of a compound containing a plant nutrient.

The amount of water in the fertilizing preparation is about 5–50% by weight, preferably about 10–30% by weight.

The oleophilic organic substance used in the fertilizing preparation improving the assimilation of phosphorus according to the invention is preferably a non-phytotoxic oil and most preferably a vegetable-based oil such as rubseed oil, soybean oil, sunflower oil, palm oil, coconut oil, corn oil, or rapeseed oil, or a mixture of these oils. The amount of oil is about 2–20% by weight, preferably about 2–6% % by weight of the fertilizing preparation improving the assimilation of phosphorus.

The quantity and quality of the surface-active substance have a crucial effect on the usability of the fertilizing preparation according to the invention. The above-mentioned surface-active substance is preferably of the w/o type and most preferably a lecithin. Other usable w/o type surface-active substances include the ester of a polyol and a fatty acid, or a derivative of the ester such as an oily or fatty monoglyceride thereof. Other w/o type surface-active substances include propylene glycol monostearate, sorbitan sesquioleate, glycerol monostearate, acetylated monoglyceride (stearate), decaglyserol octaoleate, diethylene glycol monostearate, sorbitan monooleate, propylene glycol monolaurate, sorbitan monostearate, polyoxyethylene fatty alcohol ether, and lignosulphonate. The surface-active substance can also be an emulsifier mixture.

An important characteristic of a surface-active substance is its capability to create an emulsion. The fertilizer mixture according to the invention contains about 1–25% by weight and preferably about 2–6% by weight of a surface-active substance. Instead of the water, the oleophilic substance, and the surface-active substance, technical mixtures, such as by-products of various processes, containing at least two of these components can be used. Suitable substances are distiller's grain, molasses, and vinasses.

Nitrification inhibitors, slowly soluble or slowly decomposing plant nutrients, growth improving components, plant-protecting agents, growth hormones, and/or soil-improving components can also be added to the fertilizing preparation.

As previously mentioned, the fertilizing preparation according to the invention which is in the form of a paste or emulsion-suspension is advantageously used as a fertilizer by adding it onto soil as it is, i.e. in the form of a paste or emulsion-suspension. Thus the advantage is accomplished in that the storing, transportation, and spreading equipment of liquid manure which already exist in farms, can be used to spread it.

A few embodiments are disclosed in the following which are meant to be merely illustrative of the present invention.

Examples 1 to 7 and 9 to 19 describe the preparation of paste fertilizers.

Examples 8 and 20 describe growing tests carried out in a tray with the aid of the fertilizers.

Examples 21 to 24 describe the preparation of the fertilizers using different formulas.

All the percentages are on a weight basis, if not otherwise mentioned.

EXAMPLE 1

A mixture containing 60 g of water and 200 g of dry ground fertilizer comprising nitrogen, phosphorus, and potassium in a ratio of 15-6-12 is ground by a ball mill. A mixture is added to thus formed sludge, containing 20.7 g of rapeseed oil and 20.7 g of surface-active substance (soy lecithin) and is emulsified using a rod mixer. Finally, 20 g of citric acid is added to the product. The resulting product is paste-like.

EXAMPLES 2–5

The paste fertilizers were prepared in the manner described in Example 1, the formulas are in Table 1.

TABLE 1

| | Portion, % by weight | | | | |
|---|---|---|---|---|---|
| Example | Mixtures containing plant nutrients | Water | Organic substance | Acids | |
| 2 | 62.2 | 18.7 | 12.9 | Sokalan* | 6.2 |
| 3 | 63.9 | 19.3 | 13.2 | p-toluene sulf. acid | 3.6 |
| 4 | 65.6 | 16.4 | 13.1 | Mg-acetate | 4.9 |
| 5 | 68.3 | 11.2 | 13.7 | amm. propion. | 6.8 |

*Sokalan is a mixture of $C_2$–$C_4$-dicarboxylic acids.

EXAMPLE 6

Preparation of a fertilizer

A mixture containing 25 g of water, 27.2 g ammonium nitrate, 20.8 g of urea, 49.2 g of apatite, 38.2 g of potassium sulphate, 2.6 g of citric acid, 2.6 g of oxalic acid, and 1.3 g of formic acid is ground by a ball mill. 16.7 g of oil and 1.67 g of soy lecithin are added to the resulting suspension and the mixture is emulsified using a rod mixer. The product is paste-like.

EXAMPLE 7

A mixture containing 28 g of water, 25.6 g of ammonium nitrate, 19.4 g of urea, 46.4 g of apatite, 35.8 g of potassium sulphate is ground by a ball mill. 12.3 g of oil and 12.3 g of soy lecithin are added to the resulting suspension and the mixture is emulsified using a rod mixer. Finally, 12.6 g of concentrated nitric acid is added. The product is paste-like.

EXAMPLE 8 growing tests

Seven liters of moist soil was portioned into Baumann-trays. Paste-like fertilizers were spread out using disposable syringes of 10 ml each. The used amounts of fertilizers (200 mg/l of N, 40 mg/l of P, 200 mg/l of K) were counted per 7 liters of soil. Solid chemicals ($KNO_3$, $NH_4NO_3$, $KCl$) for balancing the nutrients were used by those test participants who received granular test fertilizers. The amounts of nutrients for those test participants who had received paste-like test fertilizers were mainly balanced using NK-paste. The plant grown in the trays was rye-grass. The grass harvests were dried in an incubator and their phosphorus contents were determined. Granular fertilizer (Examples 1–5) in accordance with the present practice or granular fertilizer containing apatite (Examples 6–7) were used as comparison. The results are in Table 2.

TABLE 2

| Fertil. | P-intake of 1. harvest mg/tray | P-intake of 2. harvest mg/tray | 1 + 2 P-intake | % of the comparison |
|---|---|---|---|---|
| NPK-granule* | 80.1 | 48.2 | 128.30 | 100 |
| Example 1 | 87.6 | 47.9 | 135.50 | 106 |
| Example 2 | 84.8 | 49.3 | 134.10 | 105 |
| Example 3 | 81.9 | 56.3 | 138.20 | 108 |
| Example 4 | 84.8 | 53.8 | 138.60 | 108 |
| Example 5 | 84.4 | 54.3 | 138.70 | 108 |
| NPK-granule, P as apatite* | 54.4 | 40.4 | 94.80 | 100 |

TABLE 2-continued

| Fertil. | P-intake of 1. harvest mg/tray | P-intake of 2. harvest mg/tray | 1 + 2 P-intake | % of the comparison |
|---|---|---|---|---|
| Example 6 | 59.6 | 45.5 | 105.10 | 111 |
| Example 7 | 68.9 | 46.7 | 115.60 | 122 |

(*= comparison)

The test results indicate that the extraction of phosphorus for plants has improved. Especially for the fertilizer containing apatite, the effect of acid is considerable.

EXAMPLE 9

Preparation of a fertilizer

A mixture containing 12.g g of water and 50 kg of dry, ground fertilizer, which contains nitrogen, phosphorus and potassium in the ratio of 15-6-12, is ground in a bead mill at the temperature of 40° C. The resulting suspension is pumped into an emulsifying apparatus, where a mixture at 40° C. temperature is added to it, containing 5 kg of rapeseed oil and 5 kg of surface-active substance (soy lecithin), and emulsified. Finally, 500 g of acid compound is added to the product, containing oxalic, citric, and formic acids in a weight ratio of 1:1:1. The resulting product is paste-like.

EXAMPLES 10–16

Preparation of fertilizers

Emulsion fertilizers were prepared in such a way that suspensions were first made, using the bead mill, of water and the fertilizing powder according to Example 1, then rapeseed oil and lecithin was added, it was emulsified, and finally different organic acids, mixtures or salts thereof, inorganic acids or mixtures of inorganic and organic acids were mixed with the product. The formulas are shown in Table 3.

TABLE 3

| | Portion, % by weight | | | | |
|---|---|---|---|---|---|
| Example | Mixtures containing plant nutrients | Water | Organic subst. | Acids | |
| Comparative test | 68.9 | 17.2 | 13.9 | — | |
| 10 | 68.4 | 17.1 | 13.7 | Nitric acid | 0.6 |
| | | | | Phosphoric acid | 0.15 |
| 11 | 6S.0 | 16.1 | 15.4 | Nitric a. | 2.9 |
| | | | | Phosph. a. | 0.7 |
| 12 | 69.9 | 12.6 | 14.0 | Oxalic a. | 1.4 |
| | | | | Citric a. | 1.4 |
| | | | | Formic a. | 0.75 |
| 13 | 69.4 | 15.3 | 13.9 | Phosph. a. | 0.69 |
| | | | | Oxalic a. | 0.28 |
| | | | | Citric a. | 0.28 |
| | | | | Formic a. | 0.14 |
| 14 | 70.4 | 14.8 | 14.1 | Sokalan | 0.35 |
| | | | | Acetic a. | 0.35 |
| 15 | 68.5 | 14.4 | 13.7 | Sokalan | 2.7 |
| | | | | Acetic a. | 0.68 |
| 16 | 69.8 | 17.2 | 13.9 | Hydrolyzed polyacrylic amide | 0.1 |

EXAMPLE 17

Preparation of a fertilizer

A mixture containing 5 kg of water, 18.5 kg of nitrochalk (KAS), 11 kg of urea, and 20.5 kg of potassium sulphate is ground by a bead mill at the temperature of 40° C. The resulting suspension is pumped into the emulsifying apparatus where a mixture at 40° C. is added to it, containing 5 kg of rapeseed oil and 5 kg of soy lecithin. Finally, 2.5 kg of citric acid is added to the product.

EXAMPLES 18–19

Preparation of fertilizers

Emulsion fertilizers were prepared in such a way that suspensions were first made, using the bead mill, from water and the fertilizing powder according to Example 17, the rapeseed oil and lecithin were added, it was emulsified and finally, a mixture of organic acids was added to the product. The formulas are shown in Table 4.

TABLE 4

| | Portion, % by weight | | | | |
|---|---|---|---|---|---|
| Example | Mixtures containing plant nutrients | Water | Organic substance | Acids | |
| Comp. | 74.7 | 10.4 | 14.9 | — | |
| 18 | 76.3 | 7.6 | 15.3 | Oxalic a. | 0.3 |

TABLE 4-continued

| | Portion, % by weight | | | |
|---|---|---|---|---|
| Example | Mixtures containing plant nutrients | Water | Organic substance | Acids |
| 19 | 74.1 | 7.4 | 14.8 | Citric a. 0.3 |
| | | | | Formic a. 0. 15 |
| | | | | Oxalic a. 1.5 |
| | | | | Citric a. 1.5 |
| | | | | Formic a. 0.75 |

EXAMPLE 20

Growing tests 3.5 liters of dry sandy soil was transferred to trays of 5 liters each. The soil was fertilized using the fertilizers according to examples in and a comparative fertilizer in such a way that the nutrient amounts in the trays mg/kg of soil were as follows: 300 mg/kg of N, 300 mg/kg of $P_2O_5$, and 300 mg/kg of $K_2O$. The grass grown in the trays was rye-grass. The grass in the trays was cut after 4 weeks and again after 7 weeks of planting. The cut grass samples were dried and dry weights and phosphorus contents were determined on them. The extraction of phosphorus of the plants was compared to corresponding paste-like fertilizers which had no acids added thereto. The results are in Table 5.

TABLE 5

| Fertilizer | P-intake of 1. harvest mg/tray | P-intake of 2. harvest mg/tray | 1 + 2 P-intake | % of the comparison |
|---|---|---|---|---|
| NPK-paste* | 31.1 | 37.6 | 68.72 | 100 |
| Example 9 | 49.5 | 42.2 | 91.70 | 133 |
| Example 10 | 35.2 | 43.6 | 78.80 | 115 |
| Example 11 | 42.2 | 46.5 | 88.70 | 129 |
| Example 12 | 48.3 | 46.9 | 95.20 | 139 |
| Example 13 | 46.6 | 41.3 | 87.90 | 128 |
| Example 14 | 39.4 | 37.8 | 77.20 | 112 |
| Example 15 | 39.6 | 45.8 | 85.40 | 124 |
| Example 16 | 56.8 | 47.3 | 104.1 | 152 |
| NK-paste* | 14.8 | 21.8 | 36.60 | 100 |
| Example 17 | 21.4 | 20.9 | 42.30 | 116 |
| Example 18 | 17.2 | 21.6 | 38.80 | 106 |
| Example 19 | 25.4 | 20.4 | 45.80 | 125 |

(* = comparison)

The results show that the extraction of phosphorus of plants was improved considerably by fertilizers containing acid components, as much as 50% at the most. The test which was carried out using NK-pastes showed that acids improved the utilization of phosphorus in soil.

EXAMPLES 21–24

Preparation of fertilizers using different formulas

The raw material containing plant nutrients were ground, mixed with water, distiller's grain or vinasses, by a ball mill. Oil and lecithin were added when needed and emulsifying was carried out by a rod mixer. The formulas are in Table 6.

TABLE 6

| | Portion, % by weight | | | |
|---|---|---|---|---|
| Component | Example 21 | Example 22 | Example 23 | Example 24 |
| Powdered | | | | |

TABLE 6-continued

| | Portion, % by weight | | | |
|---|---|---|---|---|
| Component | Example 21 | Example 22 | Example 23 | Example 24 |
| fertilizer | | | | |
| NPK 15-6-12 | 47.6 | 49 | 79 | |
| $NH_4NO_3$ | | | | 17.9 |
| Urea | | | | 13.6 |
| Apatite | | | | 32.4 |
| $K_2SO_4$ | | | | 25.1 |
| Water | | 9.6 | 11 | 4.5 |
| Distiller's grain (36% dry matter) | 31.4 | 32.6 | | |
| Vinasses | | | 8 | 4.5 |
| Oil | 8 | 3.4 | | |
| Lecithin | 8 | 3.4 | | |
| Citric acid | 5 | 2 | | |
| Nitric acid | | | 2 | 2 |

We claim:

1. A controllably active fertilizing preparation which is in the form of an emulsion-suspension or an emulsion, comprising:
   (a) 30–90% by weight of a plant nutrient mixture containing phosphate ion,
   (b) 5–50% by weight of water,
   (c) 2–20% by weight of an oleophilic organic substance,
   (d) 1–25% by weight of a W/O surface-active agent, and
   (e) 0.1–10% by weight of an organic acid or salt or anhydride thereof or an inorganic acid.

2. The fertilizing preparation of claim 1, wherein said preparation is in the form of a paste.

3. The fertilizing preparation of claim 1, wherein said organic acid is a $C_1$–$C_{10}$-monocarboxylic acid, hydroxycarboxylic acid or a dicarboxylic acid, a salt thereof, an anhydride thereof or a mixture thereof.

4. The fertilizing preparation of claim 1, wherein the inorganic acid is nitric acid or phosphoric acid.

5. The fertilizing preparation according to claim 1, wherein the organic acid is an anionic polyelectrolyte, or mixtures thereof.

6. The fertilizing preparation according to claim 5, wherein said polyelectrolyte is polyacrylic acid or polymethacrylic acid.

7. The fertilizing preparation of claim 5, wherein the organic acid is a hydrolyzed polyacrylamide.

8. The fertilizing preparation of claim 1, wherein the amount of the acid component (e) ranges from 2–6% by weight.

9. The fertilizing preparation of claim 1, wherein a plant nutrient of component (a) is the low water soluble phosphorus compound apatite.

10. The fertilizing preparation of claim 1, wherein the amount of component (a) is at most 60% by weight of the preparation.

11. The fertilizing preparation of claim 1, wherein the amount of said component (a) is at most 80 wt. % of the preparation.

12. The fertilizing preparation of claim 1, wherein the amount of said oleophilic organic substance (c) is at most 6% by weight of the preparation.

13. The fertilizing preparation of claim 1, wherein the maximum amount of the surface-active agent (d) is 6% by weight.

14. The fertilizing preparation of claim 1, wherein the amount of water (b) is at most 40% by weight.

15. The fertilizing preparation of claim 1, wherein the amounts of plant nutrients (a) and water (b) are such that the aqueous fertilizer mixture formed is at least near the saturation point.

16. The fertilizing preparation of claim 1, wherein the plant nutrient component (a) contains the cations $NH_4^+$, $K^+$, $Ca^{2+}$, $Mg^{2+}$; on the anions $NO_3^-$, $Cl^-$, $SO_4^{2-}$, phosphates, polyphosphates, or on urea or on micronutrients or mixtures thereof.

17. The fertilizing preparation of claim 1, wherein the oleophilic organic substance (c) is a non-phytotoxic oil.

18. The fertilizing preparation of claim 17, wherein the non-phytotoxic oil is selected from the group consisting of rubseed oil, sunflower oil, palm oil, coconut oil, corn oil, rapeseed oil or mixtures thereof.

19. The fertilizing preparation of claim 1, wherein the surface-active agent (d) is lecithin, an ester of a polyol and a fatty acid or derivative thereof or a lignosulfonate.

20. The fertilizing preparation of claim 19, wherein said ester is a monoglyceride.

21. The fertilizing preparation of claim 1, wherein said oleophilic substance (c) is distiller's grain.

22. The fertilizing preparation of claim 1, which further comprises nitrification inhibitors, slowly-soluble plant nutrient components, pesticides, growth hormones and soil improving components.

23. A method of fertilizing the soil, comprising spreading on said soil the fertilizing preparation of claim 1.

24. The method of claim 23, wherein said preparation is in the form of a paste or emulsion.

* * * * *

UNITED STATES PATENT AND TRADEMARK OFFICE
CERTIFICATE OF CORRECTION

PATENT NO. : 5,482,529
DATED : January 9, 1996
INVENTOR(S) : Thomas AHLNAS ET AL It is certified that error appears in the above-identified patent and that said Letters Patent is hereby corrected as shown below:

On the Title Page, [57] In the Abstract, line 2, "emulsion is" should read --emulsion, is--.

Column 3, line 3, "phosphor" should read --phosphorus--.

Column 3, line 17, "2-6% %" should read --2-6%--.

Column 3, line 31, "decaglyserol" should read --decaglycerol--.

Column 3, line 66, "the-percentages" should read --the percentages--.

UNITED STATES PATENT AND TRADEMARK OFFICE
CERTIFICATE OF CORRECTION

PATENT NO. : 5,482,529
DATED : January 9, 1996
INVENTOR(S) : Thomas AHLNAS ET AL It is certified that error appears in the above-indentified patent and that said Letters Patent is hereby corrected as shown below:

Column 4, line 23, Table 1, Example 2, under "Organic substance", "12.9" should read --12.8--.

Column 4, line 52, "growing tests" should read --Growing tests--.

Column 5, line 54, "12.g g" should read --12.5 kg--.

Column 6, Table 3, Example 11, under "Mixtures containing plant nutrients," "6S.0" should read --65.0--.

Column 6, Table 3, Example 16, under "Mixtures containing plant nutrients", "69.8" should read --68.8--.

Signed and Sealed this

Twenty-ninth Day of October 1996

BRUCE LEHMAN

Attest:

Attesting Officer

Commissioner of Patents and Trademarks